United States Patent

Paluck

[15] 3,706,975

[45] Dec. 19, 1972

[54] HIGH SPEED MOS RANDOM ACCESS MEMORY

[72] Inventor: Robert J. Paluck, Austin, Tex.

[73] Assignee: Texas Instruments Incorporated, Dallas, Tex.

[22] Filed: Oct. 9, 1970

[21] Appl. No.: 79,584

[52] U.S. Cl. ..............................340/173 FF, 307/238

[51] Int. Cl. ..............................................G11c 11/40

[58] Field of Search..........340/173 FF; 307/238, 279

[56] References Cited

UNITED STATES PATENTS 3,541,530 11/1970 Spampinato ....................340/173 FF

OTHER PUBLICATIONS

Electronics, "Random–ccess MOS Memory Packs More Bits to the Chip" by Boysel et al., 2/16/70, pages 109–15.

*Primary Examiner*—Stanley M. Urynowicz, Jr.
*Attorney*—Harold Levine, James O. Dixon, Andrew M. Hassell, Melvin Sharp and Rene E. Grossman

[57] ABSTRACT

Disclosed is a high speed insulated gate field effect transistor random access memory circuit integrated on a monolithic chip. The memory circuit utilizes a low voltage decoding circuit that is compatible with transistor-transistor-logic circuit output levels, enabling a reduction in the number of discrete MOS devices required for each memory cell. Also disclosed is a novel method for decoding wherein all of the lines of the memory matrix are brought high at the start of each cycle, recharging the internal capacitance of all of the memory cells of the matrix. All of the undesired lines of the memory matrix are then discharged through an OR circuit arrangement connected in series with each line, thereby disconnecting all but a preselected cell of the memory matrix from the computer input/output sense lines.

15 Claims, 15 Drawing Figures

INVENTOR
Robert J. Paluck
BY René E. Grossman
ATTORNEY

Richard L Donaldson
WITNESS

HIGH SPEED MOS RANDOM ACCESS MEMORY

This invention relates to dynamic random access memory systems and more specifically to an insulated gate field effect transistor memory circuit that is directly compatible with transistor-transistor-logic output signal levels, and to a novel method of decoding the coordinate location of the memory matrix that defines the memory cell to be operated on by the computer.

Present computer systems are predominantly composed of transistor-transistor-logic (TTL) circuits that require logic level signals in the range of 0 – 5 volts. Even though computer circuitry is predominantly TTL, many advantages may be achieved by utilizing insulated gate field effect transistor (hereinafter referred to as MOS transistors) circuitry for the memory matrix of the computer. Either p-channel or n-channel devices may be utilized as desired. Memory cells utilizing MOS transistors permit less complex processing techniques and greater packing density resulting in considerable cost and space savings inasmuch as memories require an extremely large number of memory cells. A major problem associated with an MOS memory, however, centers around the fact that the MOS devices used in decoding conventionally require 0 – 18 volts to operate at required computer speeds. A negative voltage in the range of 18 volts is required to bias on a p-channel device while a positive voltage in the range of 18 volts is required to switch on n-channel MOS devices. This, of course, causes interface problems with TTL circuitry. To date, expensive and space consuming translators or time consuming buffer stages are used to achieve compatibility between the biasing levels of the TTL circuitry and MOS memory systems.

The primary interfacing problem between an MOS memory matrix and TTL circuitry occurs in the decoding operation. In a conventional random access memory system, the central processing unit of the computer gives to the memory decoder two numbers to describe the memory location it intends to operate on; one number corresponds to the *x* coordinate and the other number corresponds to the *y* coordinate of the memory matrix. Each of these numbers is stored in an address register in binary form as a series of bits. The bits function as inputs to the memory decoder which determines the *x* and *y* coordinates corresponding thereto and activates the corresponding *x* and *y* lines in the memory matrix. That is, it brings these "selected" lines high by applying a voltage thereto in the range of 15 – 18 volts. As used herein, the terminology "bringing the line high" refers to applying a voltage in the range of 15 – 18 volts to the line to charge it. The voltage may be either negative or positive, depending on whether p-channel or n-channel MOS devices are being controlled. Memory cells of the matrix that simultaneously have both *x* and *y* lines high are then connected to the input/output sensor lines of the computer to either be read out of or written into. A conventional method of decoding with MOS devices is to first select the proper lines (that is, the *x* and *y* lines connecting the cells defined by the desired *x* and *y* coordinates of the memory matrix) and then bringing these *x* and *y* lines high. Typically, several interconnected MOS devices are required in order to effect such decoding. The respective MOS devices are required to be extremely large in order to charge up the line selected thereby as quickly as possible. Additionally, these devices require high input biasing voltages that are incompatible with the biasing levels of TTL circuitry. Also, MOS decoding means that require several interconnected MOS devices typically require on the order of 2 – 3 microseconds to charge up a selected line of the memory matrix. Alternately, decoding has been accomplished off the semiconductor chip using relatively expensive transistor-transistor-logic circuits. While these decoding circuits may be bonded to the surface of the chip if desired, such an arrangement requires a large amount of the surface area of the chip which reduces the number of MOS transistors that may be formed thereon.

Accordingly it is an object of the present invention to produce an improved MOS decoding circuit for MOS random access memories.

It is a further object of the present invention to provide an MOS memory matrix and associated decoding means that are directly compatible with transistor-transistor-logic signal levels.

It is a further object of the present invention to provide an MOS memory cell requiring only four MOS devices.

An additional object of the present invention is to provide an MOS memory circuit integrated on a monolithic chip requiring only two connections to the chip.

Yet another object of the present invention is to provide an extremely fast random access memory using MOS devices and having switching speeds less than 150 nanoseconds.

Briefly and in accordance with the present invention, a high speed MOS random access memory circuit is integrated on a monolithic chip to be directly compatible with TTL biasing levels. An MOS device is provided for each *x* and *y* line of the matrix of memory cells. This MOS device is biased "on" at the beginning of each cycle and is operative to bring all *x* and *y* lines of the memory matrix high, thereby recharging the capacitance of all the memory cells of the matrix. Since only one MOS device is required to be biased on to bring each *x* or *y* line high, the charging time of each line is relatively fast. A second MOS device is connected to an OR circuit and the the combination is operative to discharge (that is, reduce to zero voltage) all of the *x* and *y* lines of the matrix except the preselected *x* and *y* lines mutually connected to the cell of the matrix desired to be operated on by the computer and identified by *x* and *y* coordinate inputs to the memory decoder. The MOS devices for discharging the lines may be fabricated to be directly compatible with TTL input levels.

The novel features believed to be characteristic of this invention are set forth in the appended claims. The invention itself, however, as well as other objects and advantages thereof may best be understood by reference to the following detailed description when read in conjunction with the accompanying drawings wherein:

Figure 1:
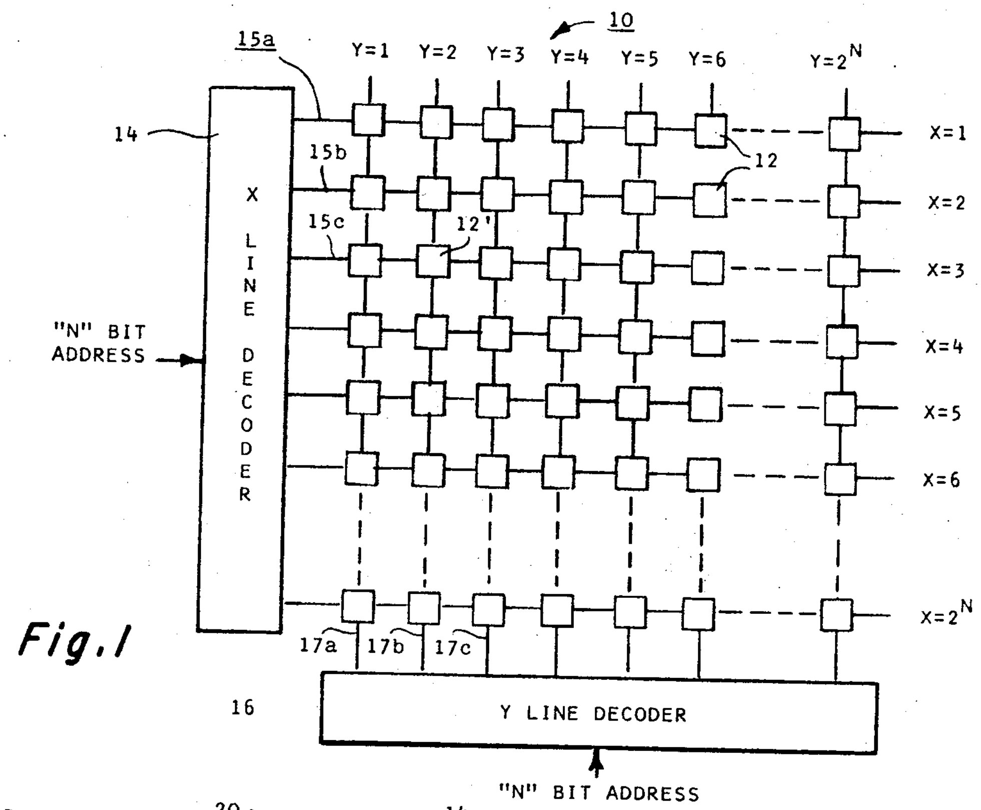
FIG. 1 is a partially schematic and partially block diagram view of an MOS memory circuit in accordance with the present invention.
Figure 3:
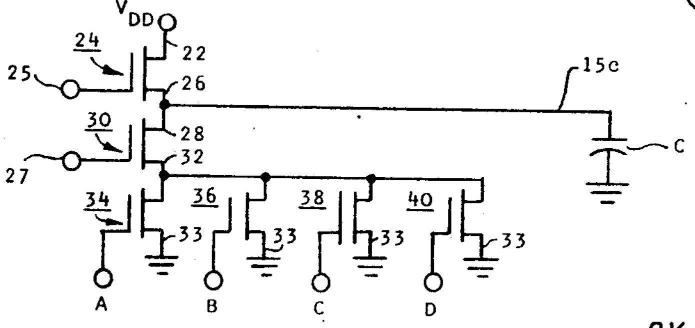
Figures 4, 5:
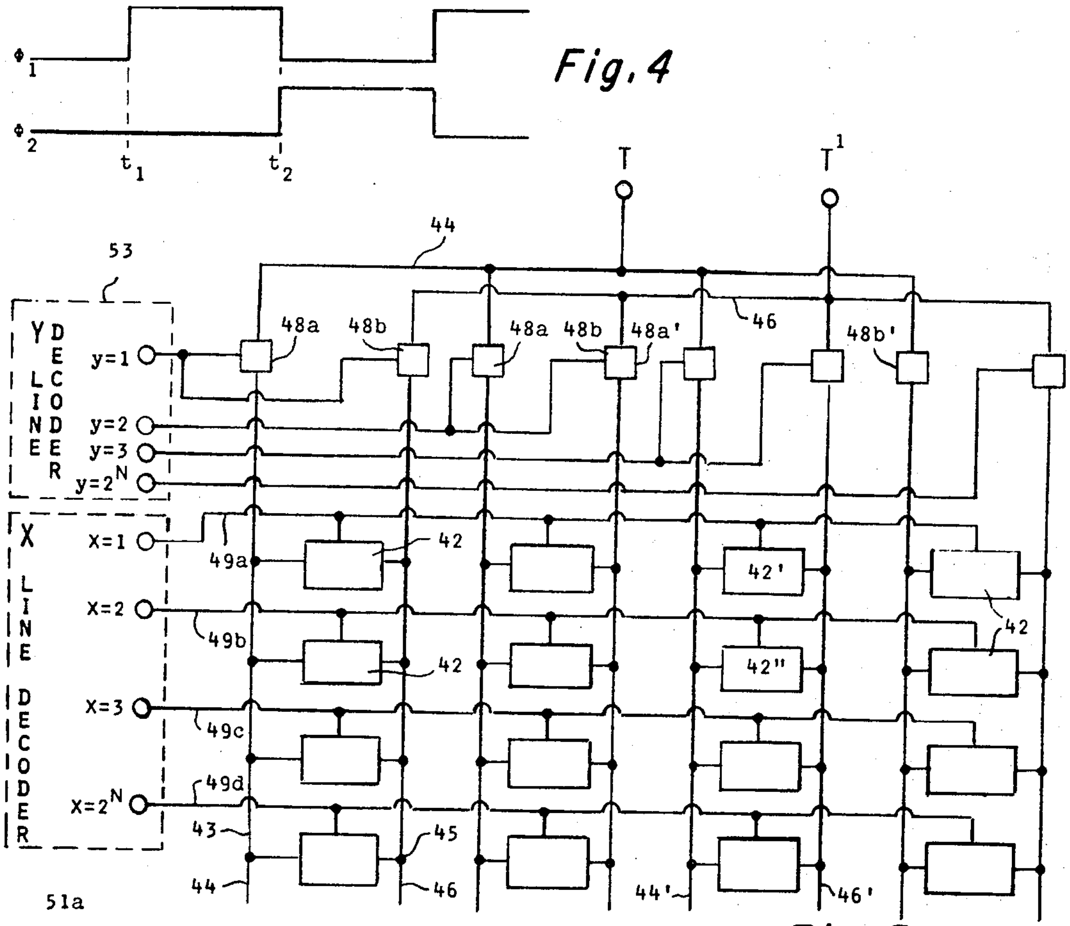
Figure 6:
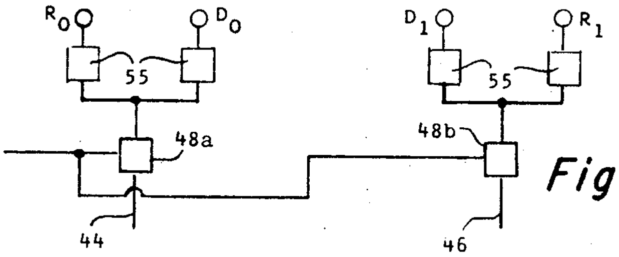
Figure 7:
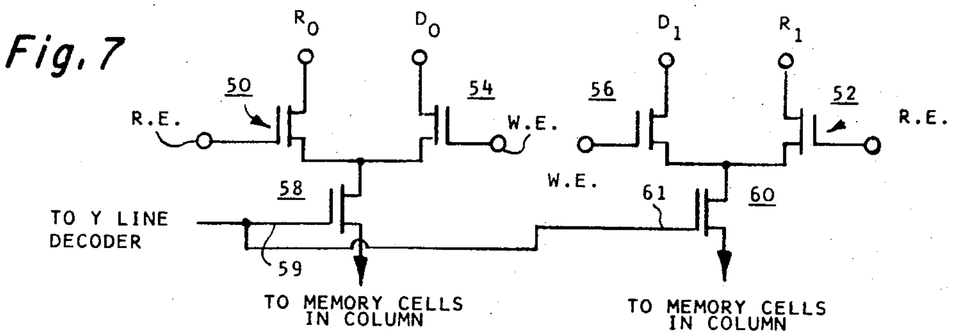
Figures 8, 9, 10, 11:
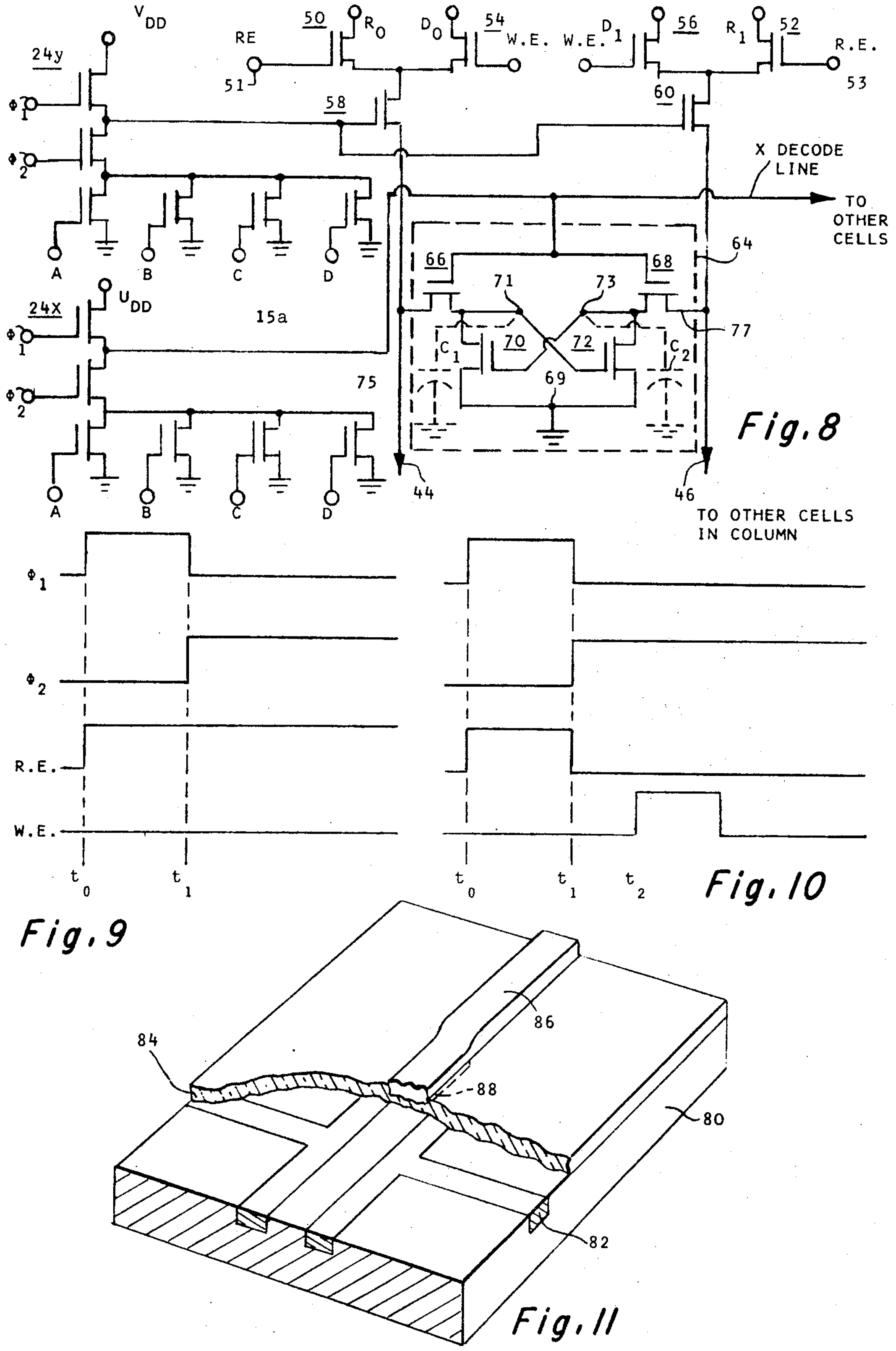
Figures 12, 13, 14A, 14B:
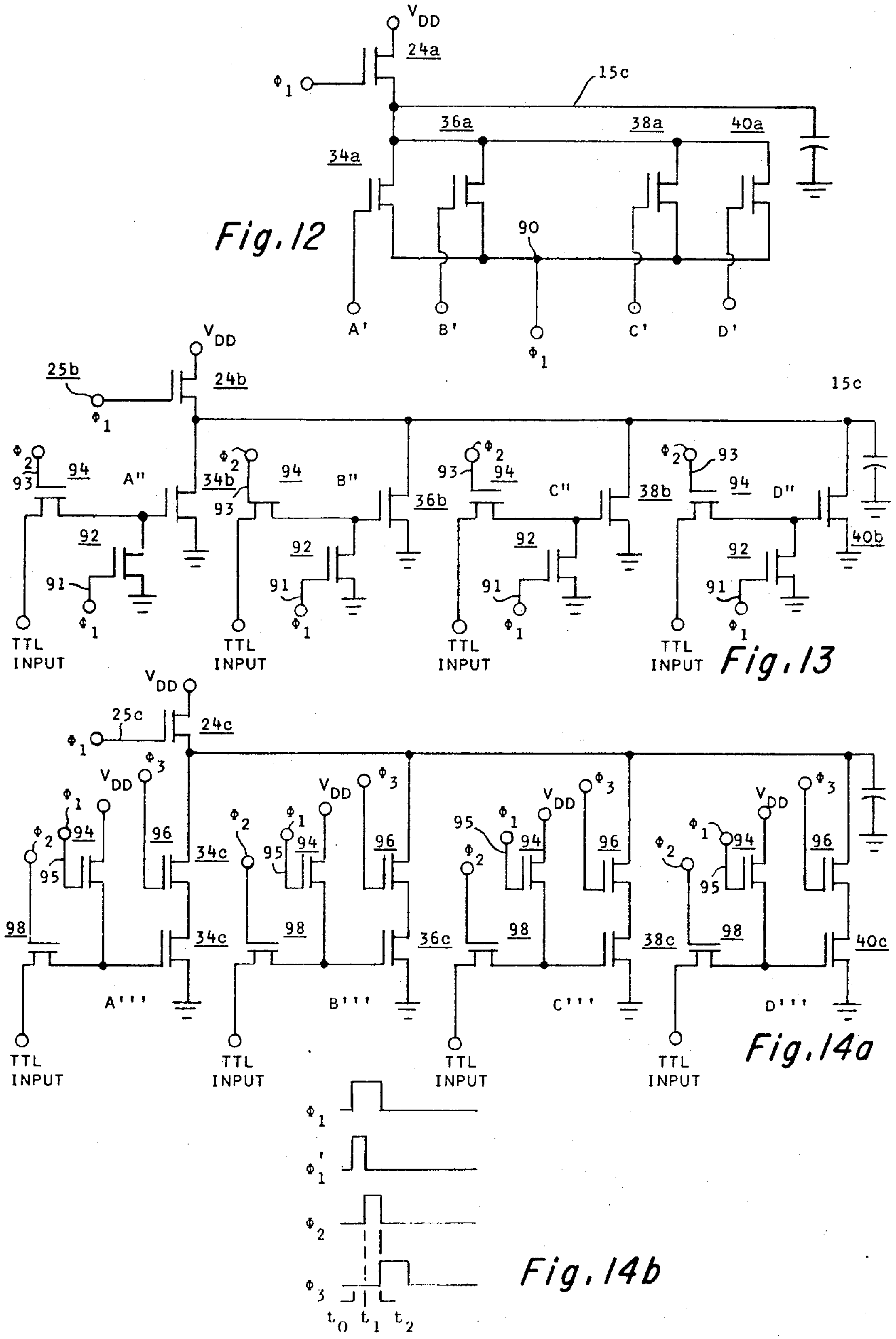

FIG. 3 schematically depicts a decoding circuit in accordance with one embodiment of the present invention;

FIG. 4 graphically depicts the clock pulses required for the circuit of FIG. 3;

FIG. 5 schematically depicts gating control means required to select a desired cell of the memory matrix shown in FIG. 1;

FIGS. 6 and 7 respectively depicts in block diagram and schematic form an alternate embodiment of the gating control means of FIG. 5;

FIG. 8 depicts schematically the gating control means of FIG. 7 with associated gating input circuitry connected to a memory cell: FIGS. 9 and 10 depict clock pulses required for reading a bit of data out and for writing a bit of data into the cell shown in FIG. 8;

FIG. 11 is an isometric view of a section of an integrated circuit into which the memory system of the present invention has been incorporated with a partial cutaway of the insulating and metallization layers for graphic purposes; and FIGS. 12–14 depict alternate embodiments of the decoding circuit of FIG. 3.

Figure 2:
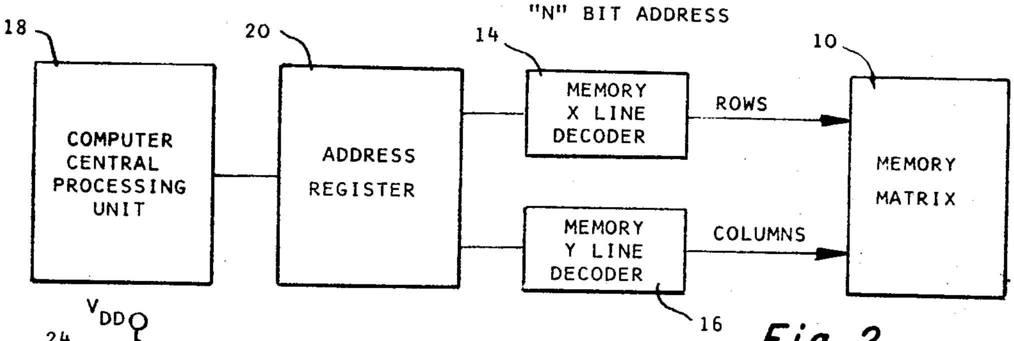
FIG. 2 is a block diagram depicting operation of the MOS memory circuit of the present invention as part of a computer system.

With reference now to the drawings and for the present specifically to FIGS. 1 and 2, there is depicted therein at 10 an MOS memory matrix. The memory matrix 10 is shown as being arranged to have *x* and *y* coordinates, *x* coordinates corresponding to rows of the cells in the matrix and *y* coordinates corresponding to columns of individual cells of the matrix. Individual memory cells are indicated at 12. An *x* coordinate decoder is shown in block diagram form at 14 to have a plurality of *x* lines such as 15*a*, 15*b*, and 15*c* connecting the decoder to the individual rows $x$=1, $x$=2, and $x$=3, of memory cells. Similarly, a *y* coordinate decoder is shown in block diagram at 16 to have a plurality of *y* lines 17*a*, 17*b*, 17*c*, etc., each *y* line connecting the *y* decoder to respective columns $y$=1, $y$=2, and $y$=3 of memory cells. Any memory cell in the matrix may be addressed by selection of the proper *x* and *y* lines. For example, selection of *x* line 15*c* and *y* line 17*b* would define only memory cell 12' of the matrix.

The *x* decoder 14 and the *y* decoder 16 are shown in FIG. 1 as being separate units. It is to be appreciated, of course, that in practice these decoders would normally be encompassed as a part of a single unit.

In operation of the memory circuit of the present invention, a computer central processing unit 18 selects two numbers to describe a memory location, such as cell 12', to be operated on by the computer. One number corresponds to an *x* coordinate and the other corresponds to a *y* coordinate of the memory matrix. These numbers are stored in binary form as a series of bits in the address register 20. The address register translates these numbers or bits to the *x* decoder 14 and the *y* decoder 16 for selection of the proper *x* line, such as 15*c*, and the *y* line, such as 17*b*, that are required to be high in order to connect the cell 12' of the memory matrix 10 to the computer. As will be explained in more detail hereinafter, the *x* and *y* decoders function first to "select" all cells of the memory matrix 10 and then to eliminate all but the cell "selected" by the *x* and *y* cordinates from the address register 20. Any desired number of bits may be used to define the *x* and *y* coordinates, depending primarily upon the size of memory matrix desired.

For the situation where N number of bits of data are used to define the *x* and *y* coordinates translated to the decoders 14 and 16, a memory matrix of cells having $2^N$ cells along each side may be constructed. For example, if four bits of data are used to code the memory location for each of the *x* and *y* decoders, there may be $2^4$ memory cells along each side of the memory matrix; that is, 16 cells along each side, giving a total memory matrix of 256 cells.

With reference to FIG. 3, an MOS decoding circuit in accordance with one embodiment of the present invention is depicted. While only one decoding circuit is illustrated, it is to be understood that the *x* decoder 14 and the *y* decoder 16 would respectively consist of as many of these decoding circuits as there are cells along each side of the matrix. That is, for a 16 × 16 matrix, there would be 16 *x* lines connecting the respective rows of cells and 16 *y* lines connecting the columns of cells, and correspondingly, 16 line decoding circuits for both the *x* and *y* decoders. For illustrative purposes, FIG. 3 depicts a decoding circuit connected to line 15*c* of the *x* decoder 14.

In FIG. 3, line 15*c* is shown terminated in a capacitance C which is connected to ground. This capacitance represents the relatively high capacitance of the line resulting from interconnection of the various MOS devices making up the row of cells in the matrix. Of course, such a capacitance also exists for lines connecting columns of memory cells. As understood by those skilled in the art, for high speed operation a memory matrix line such as 15*c* must be capable of being charged and discharged very rapidly. It is well known, however, that MOS devices are very slow in charging a high capacitance load; on the other hand, MOS devices are capable of discharging a capacitive load extremely fast.

An input to the decoding circuit of FIG. 3 is shown at $V_{DD}$. Typically this input would be in the range of 15 – 18 volts. The input $V_{DD}$ is connected to the drain 22 of an MOS transistor 24. The source terminal 26 of the transistor 24 is connected to the drain 28 of a second MOS transistor 30. Line 15*c* is connected to the junction of the source terminal 26 of transistor 24 and the drain terminal 28 of transistor 30. The source 32 of transistor 30 is commonly connected to the drain terminals of transistors 34, 36, 38 and 40. Each of these latter transistors has a source terminal 33 connected to circuit ground. The gate terminals of transistors 34, 36, 38 and 40 (shown as A, B, C and D respectively) are connected to TTL computer circuitry (not shown). As explained in more detail hereinafter, coded signals are provided to terminals A, B, C and D of each line decoder circuit to discharge all but a preselected *x* line and a preselected y line of the matrix.

Operation of the decoding circuit is as follows. A clock pulse $\Phi_1$ as shown in FIG. 4 is generated on the chip in accordance with techniques well known in the art and is applied to the gate terminal 25 of the MOS device 24. At time $t_1$, the clock pulse $\Phi_1$ goes high turning on the MOS device 24, and as will be described with reference to FIGS. 5 – 8, charges the line 15*c*. At time $t_2$, clock pulse $\Phi_1$ goes low and the clock signal $\Phi_2$ applied to the gate 27 of the MOS device 30 goes high, turning on transistor 30. Transistors 34, 36, 38 and 40 have inputs to their respective gate terminals A, B, C and D from the address register 20 of FIG. 2. These inputs are coded according to which line or lines of the matrix are required to remain charged. As may be seen, during the interval that $\Phi_2$ is high, if at least one of the gate inputs A, B, C or D is high, turning on the corresponding transistor, a ready path is provided to ground for line 15*c*, resulting in that line discharging to zero or ground voltage. Only for the situation where A, B, C and D are all low does the line 15*c* remain high. Clocks $\Phi_1$ and $\Phi_2$ are generated on the chip in accordance with techniques well known in the art.

Table I below shows the different coding arrangements which are possible with a four bit coding system where A represents, for example, a high input signal and $\bar{A}$ represents a low value of that signal. As understood by those skilled in the art, for a given coded signal such as $A\bar{B}CD$, which controls line 2 of the matrix, 15 of the 16 lines of the matrix will have at least one of the transistors 34, 36, 38 or 40 biased ON, thereby discharging those lines to zero. Only for line 2 will all of the transistors 34, 36, 38 and 40 remain turned off, maintaining that line in a charged condition.

TABLE I

| Inputs from Address Register | Line Controlled |
|---|---|
| $\bar{A}BCD$ | 1 |
| $A\bar{B}CD$ | 2 |
| $AB\bar{C}D$ | 3 |
| $ABC\bar{D}$ | 4 |
| . | . |
| . | . |
| . | . |
| $\bar{A}\bar{B}\bar{C}\bar{D}$ | 16 |

Transistors 34, 36, 38 and 40 are formed to have their sources connected to circuit ground. Using such an arrangement it is known in the art to fabricate these transistors such that they are operative with gate inputs A, B, C and D of a voltage level compatible with the output of transistor-transistor logic circuits. Thus, a direct interface is provided on a monolithic chip between TTL circuitry and MOS memory devices.

With reference to FIG. 5, operation of the decoding circuit of FIG. 3 may better be understood relative to selecting a specific memory cell within the memory matrix shown in FIG. 1. In FIG. 5, a basic memory cell is shown in block diagram at 42. Each cell is connected at points 43 and 45 to input/output sense lines 44 and 46 of the computer. There are a pair of sense lines 44 and 46 for each column of memory cells 42. The sense lines 44 are commonly connected together on the chip as are the sense lines 46 and thus only two leads T and T′ are required to be made connecting the chip with external circuitry.

Column gating means are shown in block diagram at 48*a* and 48*b*, gating means for each row of cells being depicted by row connecting lines such as 49*a*, 49*b*, 49*c*, and 49*d*. The inputs to the row connecting or *x* lines are provided from an *x* line decoding circuit shown diagrammatically by dashed block 51. Each of these *x* line decoding circuits may, for example, be the circuits shown in FIG. 3 or FIGS. 12–14. Similarly, the input to the column gating means is provided by a *y* line decoding circuit, shown enclosed by dashed block 53.

In response to a first clock pulse, such as $\Phi_1$ shown in FIG. 4, a relatively high voltage is applied to all of the *x* and *y* lines of the memory matrix. For example, at the line *y*=3, the high voltage would gate on column gating means 48*a*′ and 48*b*′ connecting all of the cells in that column to the input/output sense lines 44′ and 46′. The sense lines 44 and 46, including 44′ and 46′, are designed so as to always be high; therefore, in response to turning on the column gating means 48*a*′ and 48*b*′, all of the cells such as 42′ and 42″ encompassed in the column defined by 44′ and 46′ are connected to high lines. Each cell, however, has isolation means as a part thereof that prevents current from flowing between the cell and the sense lines. These isolation means are removed from a selected cell only by biasing on the *x* line connecting the row that includes that selected cell. Thus, the line *x*=3 may be brought high to bias on all of the memory cells in that row of the memory matrix to electrically connect the basic memory cells in that row to the input/output lines 44, 46. In other words, the column gating means 48*a* and 48*b* are operative to energize the respective input/output sense lines of the computer for the respective columns of cells while the row gating means are operative, for each row of cells, to remove the isolation between the input/output sense lines and the cell itself. It follows then, that when all of the column gating means and all of the row gating means are brought high by application of a pulse $\Phi_1$ to a transistor such as transistor 24 in the decoding circuit of FIG. 3, all of the cells of the memory matrix are connected to sense lines 44 and 46. Since these sense lines are defined to always be high, the capacitance of each cell is recharged in response to application of $\Phi_1$. Subsequently, when $\Phi_1$ goes to zero and $\Phi_2$ goes high, all of the column gates and row gates (that is, the *x* and *y* lines) are discharged except those lines coded by the address register of the computer to remain high. The cell thus defined by the intersection of high *x* and *y* lines is connected to the input/output sense lines of the computer and is ready to be operated on; that is, have data read out of the cell or have data written into the cell.

As shown in FIG. 5, all of the sense lines 44 are commonly connected to the terminal T which makes contact to circuitry off the chip and all of the sense lines 46 are commonly connected to terminal T′ which also makes contact to circuitry off the chip. In this embodiment, switching means are provided off the chip for determining which computer operation, that is, read or write, is to be performed. In the embodiment shown in FIG. 6, all of the switching means may be formed directly on the chip. This arrangement, however, requires that four external leads be made to the chip ($R_o$, $R_1$, $D_o$ and $D_1$). FIG. 6 schematically shows in block diagram the portion of the top of one column of the memory matrix shown in FIG. 5. The column gating means 48*a* and 48*b* are still utilized to energize the sense lines 44 and 46 for that column. In the embodiment of FIG. 6, however, switching means are provided for determining when data is to be read out of the cell and when data is to be written into the cell. $R_o$ and $R_1$ are read signals and are designed to normally be high. These signals may be the same as T, T′ above described. $D_o$ and $D_1$ are "write" signals and are designed such that one is high and one is low, representing binary one and binary zero. Either "read" or "write" signals may be connected through switching means 55 to the input/output lines 44 and 46.

With reference to FIG. 7, there is depicted the preferred embodiment wherein the read/write switching means are formed directly on the chip. In this embodiment, the read operation switching is accomplished by two MOS devices 50 and 52 while the write operation is controlled by two other MOS transistors 54 and 56. The column gating means 48*a* and 48*b* consist of MOS transistors 58 and 60. The gates 59 and 61 of transistors 58 and 60 are driven directly from a corresponding column line which may be the output of a circuit such as shown in FIG. 3.

In FIG. 8 there is shown the switching arrangement of the embodiment of FIG. 7, in combination with the decoding circuit of FIG. 3 connected to a basic memory cell in accordance with the present invention. The basic memory cell is enclosed by the dashed lines at 64. The cell comprises four MOS transistors 66, 68, 70 and 72. The transistors 66 and 68 isolate the cell from the sense lines 44 and 46 and are driven by the *x* decode line for that row, shown in FIG. 8 at 15*a*. The cell information is stored by transistors 70 and 72 in a standard cross coupled flip-flop arrangement. Intrinsic capacitance at points 71 and 73, shown schematically as $C_1$ and $C_2$ respectively, is capable of sustaining the state of the flip-flop for long durations. The computer sense lines 44 and 46 function as input/output and $V_{DD}$ supply lines. As mentioned previously input lines $R_0$ and $R_1$ are designed to always be high. During the $\Phi_1$ clock pulse all cells of the memory matrix are addressed as previously described. Thus, if a read enable (R.E.) signal is simultaneously applied to gate terminals 51 and 53 of transistors 50 and 52 during $\Phi_1$, the capacitance of all of the cells such as 64 of the memory matrix will be recharged. With reference to FIGS. 9 and 10, the wave forms for a read cycle and a write cycle are shown. At time $t_0$, both $\Phi_1$ and the read enable signal go high. When $\Phi_1$ goes high, this biases on transistors 24*y* and 24*x* respectively in FIG. 8, applying the high voltage $V_{DD}$ to the gates of transistors 58 and 60 and 66 and 68. When R.E. goes high, this biases on transistors 50 and 52, connecting the high signals $R_0$ and $R_1$ through transistors 58 and 60 (biased on by $\Phi_1$) to computer sense lines 44 and 46. Since lines 44 and 46 are high and the isolation transistors 66 and 68 of the memory cell 64 are biased on, current flows from the sense lines 44, 46 through leads 75 or 77 via transistors 50 or 52, depending on which side of the flip-flop is low, thereby recharging the cell storage capacitance. At this step all of the cells such as 64 of the memory matrix have their capacitance recharged. At time $t_1$, $\Phi_1$ goes low and $\Phi_2$ goes high. As previously explained, this discharges all of the unwanted *x* and *y* lines and leaves only the desired cell connected to the input/output sense lines 44 and 46. The state of the cell 64, that is, which side of the flip-flop is low, may be determined by any current sensing means well known in the art. The write enable (W.E.) signal during the read out operation remains low.

With reference to FIG. 10, the wave forms required for writing a bit of data into cell 64 are depicted. At time $t_0$, $\Phi_1$ and R.E. go high, recharging the entire matrix of memory cells as above described. At time $t_1$, the unwanted *x* and *y* lines are discharged by initiation of signal $\Phi_2$. Simultaneously, the R.E. signal is brought low turning off transistors 50 and 52. In this sequence, the R.E. signal is used only as a means for connecting $R_0$ and $R_1$ to the sense lines 44 and 46 which, as pointed out above, are designed to always be high. In this operation sense lines 44 and 46, via inputs $R_0$ and $R_1$, function as a voltage source to recharge the capacitance of the storage cells 64. At time $t_2$, the W.E. signal is brought high biasing on transistors 54 and 56, thereby connecting the cell 64 to inputs $D_0$ and $D_1$ via leads 75 and 77, forcing the flip-flop 70, 72 to match the state of the input $D_0$ and $D_1$. Thus, a bit of data is written into or stored in cell 64.

During the step when all the cells of a given column of the memory matrix are recharged, all of the recharging current must flow through the transistors 50 and 52. This requires that these transistors be very large. The size of transistors 50 and 52 may be greatly decreased, however, by applying both the R.E. and the W.E. signals together during the sequence when the capacitance of all the cells of the matrix are recharged. This effectively reduces the current flowing through transistors 50 and 52 to one-half of the original value, since current for a write operation is supplied from a data register through transistors 54 and 56. Also, the start of the R.E. and W.E. signals could be delayed from the start of the $\Phi_1$ signal to keep the current from building up to its maximum value.

Another technique for reducing the charging current is to apply a reduced voltage level of the pulse $\Phi_1$ to the source node 69 (which is normally connected to ground) of transistors 70 and 72 (reference FIG. 8). This is effective to decrease the voltage difference between the transistors and correspondingly reduces the required recharging current.

With reference to FIG. 11, a section from an integrated circuit implementation of the memory system of the present invention is shown. Assuming that the transistors are to be p-channel devices, the construction process begins with an N-type substrate 80 having an appropriate resistivity. By masking and diffusion techniques, p-type dopants are diffused into the surface of the substrate 80 to form channels of p-type semiconductor material as illustrated generally at reference numeral 82. In the areas where an MOS transistor is to be formed, two parallel p-type regions are diffused into the substrate. Similar channels may be used to form both the MOS transistor drain and source junctions in the interconnections between the various transistors. After completion of the entire diffusion cycle, a layer of insulating material 84 is formed on the surface of the semiconductor substrate 80. To form the transistor, it is necessary that the thickness of the insulating layer 80 be reduced in the area overlying the substrate and between the two parallel diffused p-type regions which are to be used as drain and source junctions, and that a conductive layer be formed overlying the insulating layer to form the gate terminal. The gate terminal is shown at 86 and the reduced area of the oxide is shown at 88. These operations may be performed using well known semiconductor processing techniques and are not described in detail herein.

As has been pointed out above, the inputs $R_0$ and $R_1$ act as the input/output and power line for the chip. This utilization eliminates extra lines run to each cell as done conventionally in memory arrays, effecting a reduction in the number of bonding pads and beam leads necessary to drive the chip. Additionally, since $R_0$ and $R_1$ are continuously kept high, the memory array of the present invention utilizes memory cells requiring only four MOS transistors per cell. Conventional MOS memory cells and isolation means require eight MOS transistors; for example, see U.S. Pat. No. 3,440,440 issued to A. K. Rapp, Apr. 22, 1969 and U.S. Pat. No. 3,355,721 issued to J. R. Burns, Nov. 28, 1967. In other words, in accordance with the present invention, when all of the cells are addressed at the beginning of each cycle to refresh the capacitance at points 71 and 73 of each cell, it is not necessary to run separate power lines to each cell (requiring two additional MOS devices) as is conventionally done. Nor is it necessary to provide separate *y* address lines (also requiring an additional two MOS transistors) to each cell since two transistors such as 58 and 60 of FIG. 8 provide the necessary column or *y* select gating means in accordance with the present invention.

With reference to FIGS. 12–14, depicted therein are alternate embodiments of the TTL compatible decoding circuit of FIG. 3. The embodiment of FIG. 12 has the advantages of requiring only one clock pulse such as $\Phi_1$ of FIG. 4 and of eliminating MOS transistor 30 of FIG. 3. When $\Phi_1$ goes high, transistor 24*a* is biased on, applying source $V_{DD}$ to the line 15*c* thereby charging it. Since $\Phi_1$ is also applied to node 90, which, for the circuit of FIG. 3, is normally at ground level, transistors 34*a*, 36*a*, 38*a* and 40*a* remain turned OFF, that is, they exhibit essentially open circuit characteristics. If node 90 were connected to ground, the TTL inputs present at gates A′, B′, C′, and D′ would bias on these transistors and prevent the line 15*c* from being charged. When $\Phi_1$ goes low, node 90 also goes low and the coded gate signals from TTL circuitry biases on at least one of the transistors 34*a*, 36*a*, 38*a* or 40*a* in all but the preselected *x* and *y* lines mutually connecting the desired memory cell. Thus, all of the undesired lines are discharged to the low value of $\Phi_1$.

With respect to the embodiment shown in FIG. 13, a circuit is disclosed that may advantageously be utilized for applications wherein it is desired to address all of the cells independently of addressing any specific cell. That is, in the circuit of FIG. 12, all of the cells are addressed by $\Phi_1$ going high, but when $\Phi_1$ goes low a specific cell remains high according to the coded inputs at gate A′, B′, C′, and D′. In the circuit of FIG. 13, on the other hand, a clock pulse such as $\Phi_1$ of FIG. 4 is applied to the gate 25*b* of transistor 24*b*, thereby applying a voltage $V_{DD}$ to the line 15*c*. The clock pulse $\Phi_1$ is also applied to the gates 91 of transistors 92, biasing these transistors "ON", thereby connecting the gates A″, B″, C″, and D″ of pull-down transistors 34*b*, 36*b*, 38*b* and 40*b* to ground, pulling the voltage at these gate terminals to ground thus ensuring that the pull-down transistors are "OFF" so that line 15*c* may be charged. Subsequently, pulse $\Phi_1$ goes low and pulse $\Phi_2$ goes high, turning "ON" transistors 94, thereby connecting the coded TTL inputs to gate terminals A″, B″, C″, and D″, thereby discharging all but the preselected *x* and *y* lines that are to remain high. An additional advantage of this circuit is that there is a capacitive coupling between the clock pulse voltage applied to the gates 93 of transistors 94, and the gate terminals A″, B″, C″, and D″. As a result of this coupling, a TTL voltage of about 3 volts is increased to about 5 volts at gates A″, B″, C″, and D″, thereby providing a more effective control of the transistors 34*b*, 36*b*, 38*b* and 40*b*. When $\Phi_2$ goes low, turning off transistor 94, a high voltage is maintained at gates A″, B″, C″, and D″. At the initiation of the next cycle, however, the clock pulse $\Phi_1$ applied to transistor 92 discharges this voltage turning off transistors 34*b*, 36*b*, 38*b* and 0*b*, enabling line 15*c* to be charged.

With reference to FIGS. 14*a* and 14*b*, a decoding circuit and associated clock pulses for extremely high speed operation are depicted. A clock pulse $\Phi_1$ is simultaneously applied at time $t_o$ to gates 25*c* and 95 of transistors 24*c* and 94 respectively. Transistor 24*c* is thereby biased on, connecting source $V_{DD}$ to line 15*c* so that the line becomes charged. Similarly, the source $V_{DD}$ is applied through biased "ON" transistor 94 to the gates A‴, B‴, C‴, and D‴ of pull-down transistors 34*c*, 36*c*, 38*c* and 40*c*, thus rapidly presetting or turning on these transistors. The line 15*c* does not discharge since transistors 96 are not yet turned ON. If desired, the clock pulse applied to the gate 95 of transistor 94 may be as shown at $\Phi'_1$.

Pulse $\Phi_2$ is applied at time $t_1$ and is operative to bias on transistors 98, thereby quickly discharging preselected gates A‴, B‴, C‴, and D‴, depending upon which lines are to remain high. At time $t_2$, pulse $\Phi_2$ goes low and pulse $\Phi_3$ goes high, turning on transistor 96 and effectively discharging all lines to ground except the preselected lines desired to be retained high. Since the gates A‴, B‴, C‴, and D‴ are preset by a high $V_{DD}$ (15–18V) signal, the transistors 34*c*, 36*c*, 38*c*, and 40*c* are biased on more rapidly than the corresponding circuits wherein transistors 34, 36, 38 and 40 have gate signals for turning on the transistor in the range of 3–5 volts.

Although specific embodiments of this invention have been described herein, various modifications to the details of construction will be apparent to those skilled in the art without departing from the scope of the invention.

What is claimed is:

1. An integrated circuit insulated gate field effect transistor random access memory system comprising in combination on a semiconductor chip:

a. a matrix of memory cells;

b. means for simultaneously addressing all cells with a high signal to thereby recharge the capacitance of each cell;

c. means for removing said high signal from all cells except a preselected one; and d. means for connecting said preselected cell to computer input/output sense lines.

2. A memory system as set forth in claim 1 wherein said means for removing high signals from all but a preselected cell includes a plurality of insulated gate field effect transistors formed on the chip as an OR circuit, said transistors being directly compatible with transistor-transistor-logic input levels.

3. A memory system in accordance with claim 1 wherein each of said plurality of memory cells comprises four insulated gate field effect transistors, two of which define a cross-coupled flip-flop operative to store a bit of data, and the other two of which are operative to isolate said flip-flop from other memory cells of said system.

4. In a random access memory computer system wherein the central processing unit of the computer defines $x$ and $y$ coordinates of a preselected cross-coupled flip-flop memory cell to be operated on by the computer and translates these coordinates to an insulated gate field effect transistor memory that includes said preselected memory cell as one of a plurality of memory cells integrated on a monolithic chip in a row and column matrix, each row being connected to an $x$ decoder by an $x$ line and each column being connected to a $y$ decoder by a $y$ line, the improvement comprising:

a. means for simultaneously charging all $x$ and $y$ lines of said row and column matrix of memory cells;

b. $x$ coordinate and $y$ coordinate decoding means for simultaneously discharging all of said charged $x$ and $y$ lines except those lines mutually connecting said preselected memory cell; and c. means for connecting said preselected cell to the computer input/output sense lines.

5. The random access memory system as set forth in claim 4 wherein said means for simultaneously charging all $x$ and $y$ lines of said matrix comprises an insulated gate field effect transistor in series with each of said lines, said transistor being operative in response to a gate signal, to apply a high voltage to said line, whereby gate signals simultaneously applied to each of said transistors effects a simultaneous charging of all of said $x$ and $y$ lines.

6. The random access memory system as set forth in claim 4 wherein said $x$ coordinate and $y$ coordinate decoding means for discharging all but said preselected $x$ and $y$ lines comprises for each $x$ and $y$ line of the matrix a first insulated gate field effect transistor connecting the line to an OR circuit that includes a plurality of insulated gate field effect transistors, said OR circuit being operative when said first transistor is biased on, to discharge said lines to ground when at least one of said transistors of said OR circuit is biased on.

7. The memory system as set forth in claim 4 wherein said means for connecting to the computer input/output sense lines comprises a pair of conductors connected to said chip, said pair of conductors being connected through gating means to each column of memory cells.

8. A memory system as set forth in claim 7 wherein said gating means comprises for each column of the memory matrix an insulated gate field effect transistor connected in series with each of said sense lines, said transistors having gate leads commonly connected to said $y$ coordinate decoding means.

9. An insulated gate field effect high speed random access memory circuit integrated on a monolithic chip directly compatible with transistor-transistor-logic circuitry comprising in combination:

a. a plurality of cross-coupled flip-flop memory cells arranged in a matrix, each cell of cross-coupled flip-flop, the matrix being defined by $x$ and $y$ coordinates, each of said cells having insulated gate field effect isolation means for isolating said cell from other cells of said matrix;

b. $x$ coordinate decoding means;

c. $y$ coordinate decoding means;

d. means for simultaneously addressing all of said cells of said matrix thereby to recharge the capacitance of each cell;

e. means for selecting a preselected cell to be operated on by the computer; and f. means for connecting said preselected cell to the computer sense lines to be operated on.

10. The memory circuit of claim 9 wherein said $x$ decode means and $y$ decode means are comprised of a plurality of insulated gate field effect transistors connected as an OR circuit, said transistors having gating levels directly compatible with transistor-transistor-logic outputs.

11. The memory circuit of claim 9 wherein said means for connecting selected cells to the computer comprises a pair of connectors making contact between said chip and circuitry external to said chip, said pair of connectors serving as computer input/output sense lines and a source of voltage for said memory cells.

12. The memory circuit of claim 9 wherein insulated gate field effect transistor switching means are formed on said chip for selecting whether read or write computer operations are to be performed on said selected memory cell.

13. In a random access memory matrix comprising $x$ coordinate lines connecting rows of memory cells and $y$ coordinate lines connecting columns of memory cells, a method for addressing a preselected cell of said matrix wherein the improvement comprises the steps of:

a. simultaneously bringing high all of the $x$ coordinate and $y$ coordinate lines of the memory matrix thereby to recharge the capacitance of each memory cell of said matrix; and b. discharging all of said lines except the $x$ coordinate line and the $y$ coordinate line mutually connecting said preselected memory cell.

14. The method as set forth in claim 13 wherein each of said memory cells is comprised of four insulated gate field effect transistors.

15. The method as set forth in claim 13 wherein the step of discharging all but certain preselected lines is further characterized by the steps of:

a. biasing on respective first insulated gate field effect transistors connecting each $x$ and $y$ line to a respective OR circuit defined by a plurality of insulated gate field effect transistors having source terminals commonly connected to ground and having gate leads connected to transistor-transistor-logic outputs from an address register of a computer; and b. simultaneously applying coded signals from said address register to the gate terminals of the insulated gate field effect transistors making up said OR circuits whereby when at least one of said transistors of said OR circuit is biased on, the corresponding line connected to said OR circuit is discharged to ground.

* * * * *